(12) United States Patent
Fujii et al.

(10) Patent No.: US 10,503,986 B2
(45) Date of Patent: Dec. 10, 2019

(54) PASSENGER INFORMATION DETECTION DEVICE AND PROGRAM

(71) Applicant: AISIN SEIKI KABUSHIKI KAISHA, Kariya-shi (JP)

(72) Inventors: Hiroyuki Fujii, Kariya (JP); Shin Osuga, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 5 days.

(21) Appl. No.: 15/821,912

(22) Filed: Nov. 24, 2017

(65) Prior Publication Data

US 2018/0150707 A1 May 31, 2018

(30) Foreign Application Priority Data

Nov. 25, 2016 (JP) .................. 2016-228592

(51) Int. Cl.
*G06K 9/00* (2006.01)
*G06T 7/70* (2017.01)
(Continued)

(52) U.S. Cl.
CPC .... *G06K 9/00838* (2013.01); *B60R 21/01516* (2014.10); *B60R 21/01552* (2014.10); *G06K 9/00228* (2013.01); *G06K 9/00369* (2013.01); *G06T 7/60* (2013.01); *G06T 7/70* (2017.01); *B60Y 2400/3015* (2013.01);
(Continued)

(58) Field of Classification Search
CPC ........... G06K 9/00838; G06K 9/00845; G06K 9/00228; G06K 9/00369; G06K 2009/00322; B60R 21/013; B60R 2021/0046; B60R 21/01516; B60R 21/01552; G06T 7/70; G06T 7/60; G06T 2207/30201; G06T 2207/30268; B60Y 2400/3015; G01G 19/4142;
(Continued)

(56) References Cited

U.S. PATENT DOCUMENTS 6,490,515 B1 12/2002 Okamura et al.
8,081,800 B2 12/2011 Irie et al.
(Continued)

FOREIGN PATENT DOCUMENTS

EP 1 318 043 A2 6/2003
JP 9-150662 6/1997
(Continued)

OTHER PUBLICATIONS

Extended European Search Report dated Apr. 5, 2018 in Patent Application No. 17203589.1, 6 pages.

*Primary Examiner* — Jianxun Yang
(74) *Attorney, Agent, or Firm* — Oblon, McClelland, Maier & Neustadt, L.L.P.

(57) ABSTRACT

A passenger information detection device includes: an acquisition unit that acquires an image imaged by an imaging device that is provided in an interior space of a vehicle to image a passenger seated on a seat and a detection value of a load sensor provided on the seat; a first calculation unit that calculates first information that is information on a face of the passenger from the image; and a second calculation unit that calculates second information that is information on a body size of the passenger based on the first information and the detection value.

6 Claims, 11 Drawing Sheets

(51) Int. Cl.
*G06T 7/60* (2017.01)
*B60R 21/015* (2006.01)
*G01G 19/414* (2006.01)

(52) U.S. Cl.
CPC .................. *G01G 19/4142* (2013.01); *G06K 2009/00322* (2013.01); *G06T 2207/30201* (2013.01); *G06T 2207/30268* (2013.01)

(58) Field of Classification Search
CPC .. G01G 19/00322; B60N 2/002; B60Q 1/143; G08B 21/06
See application file for complete search history.

(56) References Cited

U.S. PATENT DOCUMENTS

| | | | |
|---|---|---|---|
| 9,446,730 B1 | 9/2016 | Chen et al. | |
| 2003/0007072 A1* | 1/2003 | Mattes | G06K 9/00362 348/77 |
| 2003/0060957 A1 | 3/2003 | Okamura et al. | |
| 2004/0129478 A1* | 7/2004 | Breed | B60N 2/002 180/273 |
| 2006/0042851 A1* | 3/2006 | Herrmann | B60N 2/002 180/271 |
| 2006/0251293 A1 | 11/2006 | Piirainen et al. | |
| 2012/0242819 A1* | 9/2012 | Schamp | G08B 21/06 348/78 |
| 2017/0129436 A1 | 5/2017 | Chen et al. | |
| 2017/0129437 A1 | 5/2017 | Chen et al. | |
| 2017/0297523 A1 | 10/2017 | Chen et al. | |

FOREIGN PATENT DOCUMENTS

| | | |
|---|---|---|
| JP | 2006-205844 | 8/2006 |
| JP | 2007-122579 A | 5/2007 |
| JP | 2007-198929 | 8/2007 |
| WO | WO 2016/006019 A1 | 1/2016 |

\* cited by examiner

PASSENGER INFORMATION DETECTION DEVICE AND PROGRAM

CROSS REFERENCE TO RELATED APPLICATIONS

This application is based on and claims priority under 35 U.S.C. § 119 to Japanese Patent Application 2016-228592, filed on Nov. 25, 2016, the entire contents of which are incorporated herein by reference.

TECHNICAL FIELD

This disclosure relates to a passenger information detection device and a program.

BACKGROUND DISCUSSION

In the related art, a technique for detecting passenger information of a vehicle is known (for example, refer to US Unexamined Patent Application Publication No. 2006/0251293 (Reference 1), JP 2007-198929A (Reference 2), and JP 2006-205844A (Reference 3)). The passenger information is information on a body size of the passenger, and generally, is identification information for determining whether the passenger is a child or not. The detected passenger information is used for various types of controls such as an airbag deployment control.

Another example of the related art includes JP 9-150662A (Reference 4).

Regarding a system for detecting the passenger information, improvement in detection accuracy is required.

Thus, a need exists for a passenger information detection device and a program which are not susceptible to the drawback mentioned above.

SUMMARY

A passenger information detection device according to an aspect of this disclosure includes, as an example, an acquisition unit that acquires an image imaged by an imaging device that is provided in an interior space of a vehicle to image a passenger seated on a seat and a detection value of a load sensor provided on the seat, a first calculation unit that calculates first information that is information on a face of the passenger from the image, and a second calculation unit that calculates second information that is information on a body size of the passenger based on the first information and the detection value.

A program according to an aspect of this disclosure causes, for example, a computer to execute a procedure of acquiring an image imaged by an imaging device that is provided in an interior space of a vehicle to image a passenger seated on a seat and a detection value of a load sensor provided on the seat, a procedure of calculating information on a face of the passenger from the image, and a procedure of calculating information on a body size of the passenger based on the information and the detection value.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an example in which a passenger information detection device of the present embodiment is mounted on a vehicle 1 will be described.

First Embodiment

The vehicle 1 of a first embodiment may be, for example, an automobile including an internal-combustion engine (not illustrated) as a driving source, that is, an internal-combustion engine automobile, an automobile including an electric motor (not illustrated) as a driving source, that is, an electronic automobile and a fuel cell automobile, or the like. The vehicle 1 may be a hybrid automobile including both of them as driving sources and an automobile equipped with the other driving source. In addition, the vehicle 1 can be equipped with various types of transmission devices, and can be equipped with various types of devices necessary for driving an internal-combustion engine and an electric motor, for example, a system, parts, and the like. In addition, a method, the number, a layout, or the like of the device related to the driving of the wheels in the vehicle 1 can be variously set.

Figure 1:
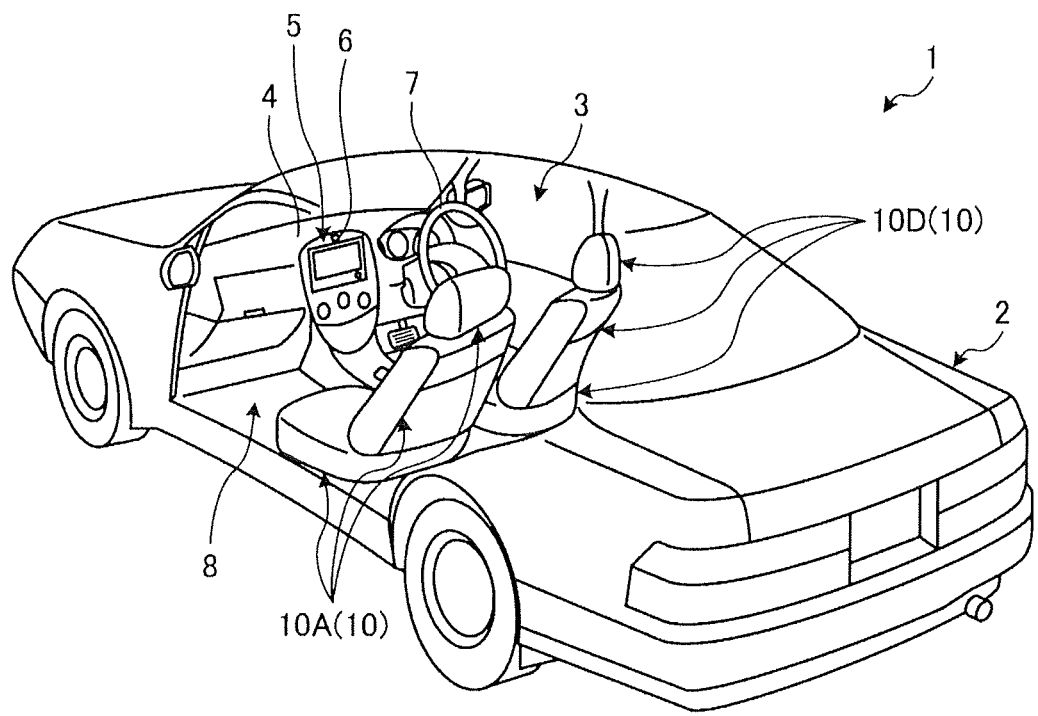
FIG. 1 is a perspective view illustrating an example of a state where a vehicle room of a vehicle mounting a passenger information detection device of a first embodiment is partly viewed in a perspective manner.

FIG. 1 is a perspective view illustrating an example of a state where a vehicle room 3 of the vehicle 1 mounting a passenger information detection device of the first embodiment is partly viewed in a perspective manner.

As illustrated in FIG. 1, a vehicle body 2 configures the vehicle room 3 where a user can ride. In the vehicle room 3, two seats 10D and 10A are provided on a floor portion 8. The seat 10D is a driver's seat, and a steering portion 7 is provided in a state of facing the seat 10D. The seat 10A is a passenger seat. The steering portion 7 is, for example, a steering wheel extruded from a dashboard 4. The steering portion 7 is not limited to the steering wheel.

In the description of the first embodiment, an example in which the passenger sitting on the seat 10A of the passenger seat is set to a detection object of passenger information will be described. The detection object of the passenger information is not limited to the passenger sitting on the seat 10A of the passenger seat. The passenger sitting on the seat 10D of the driver's seat or the passenger sitting on a back seat may be the detection object of the passenger information.

Figure 2:
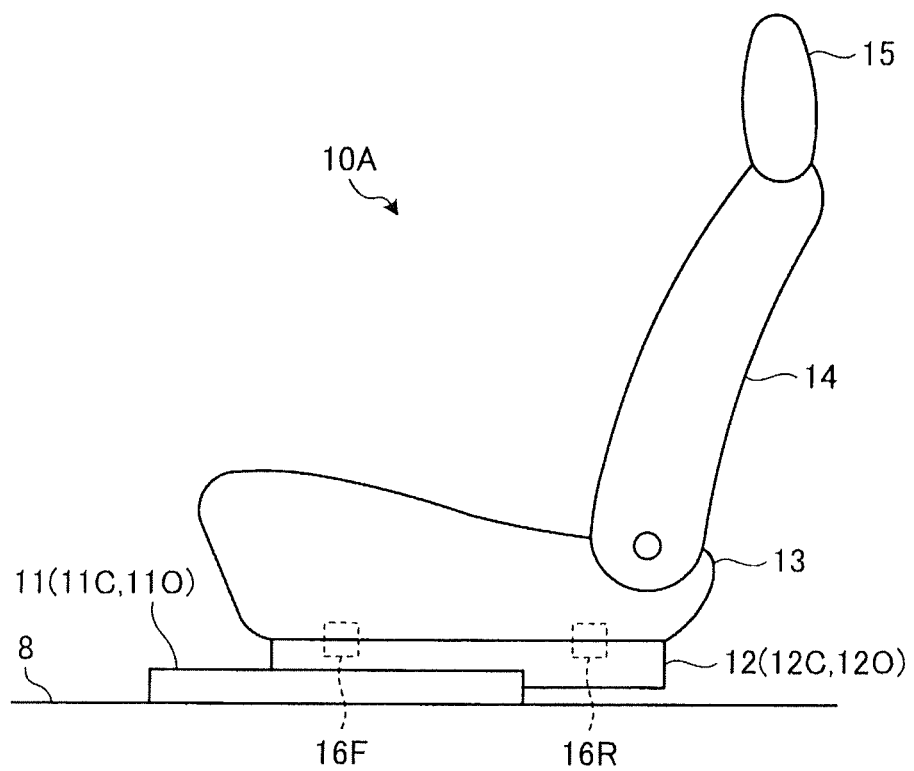
FIG. 2 is a side view of a seat of a passenger seat of the first embodiment.
Figure 3:
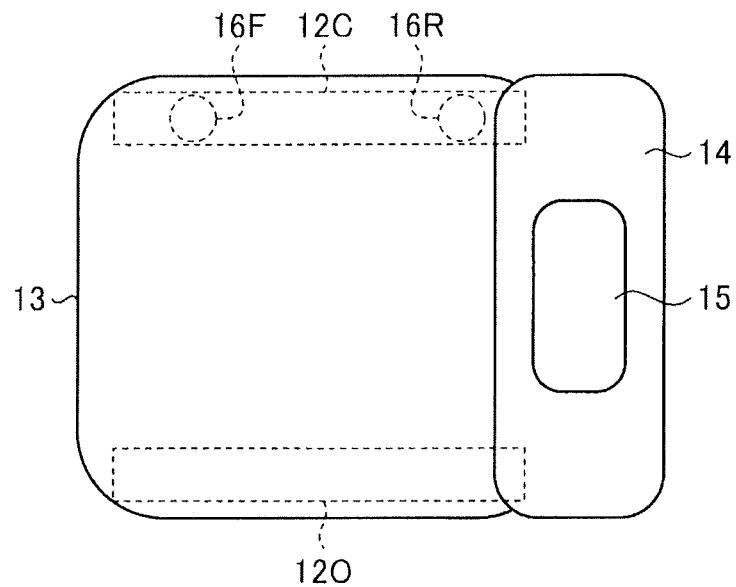
FIG. 3 is a top view of a seat of the passenger seat of the first embodiment.

A load sensor (a load sensor 16) is provided on the seat 10A that is a seat of the passenger of the detection object of the passenger information. FIG. 2 is a side view of the seat 10A of the passenger seat of the first embodiment, and FIG. 3 is a top view of the seat 10A of the passenger seat of the first embodiment.

A pair of left and right lower rails 11 (11C and 11O) extending in a longitudinal direction of the vehicle 1 is provided on the floor portion 8 of the vehicle 1. In addition, upper rails 12 (12C and 12O) moveable relative to each other in an extending direction are mounted on each lower rail 11. A seat portion 13 of the seat 10A is supported by a pair of left and right upper rails 12 (12C and 12O).

The lower rail 11C is the lower rail 11 provided on a center side of the vehicle 1 in the lateral direction, and the lower rail 11O is the lower rail 11 provided on a door side (side opposite to the center side) of the vehicle 1 in the lateral direction. Similarly, the upper rail 12C is the upper rail 12 provided on a center side of the vehicle 1 in the lateral direction, and the upper rail 12O is the upper rail 12 provided on the door side of the vehicle 1 in the lateral direction. Hereinafter, the longitudinal direction of the vehicle 1 is simply referred to as the longitudinal direction. In addition, the lateral direction of the vehicle 1 is simply referred to as the lateral direction.

The seat portion 13 is provided with a backrest portion 14 provided at the rear end in the longitudinal direction so as to be tiltable with respect to the seat portion 13. A headrest 15 is provided at the upper end of the backrest portion 14.

Two load sensors 16 (16F and 16R) are provided on the seat portion 13. Specifically, two load sensors 16 are interposed between the upper rail 12C and the seat portion 13 supported above the upper rail 12C. The load sensor 16F among two load sensors 16 is provided at a front side in the longitudinal direction, and the load sensor 16R among two load sensors 16 is provided at a rear side in the longitudinal direction. In other words, the load sensor 16R is provided behind the load sensor 16F in the longitudinal direction of the vehicle 1. The load sensors 16F and 16R output a detection value of the load to an electronic control unit (ECU) 20 to be described later.

As the load sensor 16 (16F and 16R), any type of sensor can be adopted as long as it detects and outputs the force received. For example, a sensor using a piezoelectric element, a strain gauge type load cell, a capacitance type load cell, or the like can be adopted.

The number of load sensors 16 to be provided on the seat 10A is set to two. However, the number of the load sensors 16 to be provided on the seat 10A is not limited to two. In addition, the position where the load sensor 16 is provided is not limited to the above.

Returning to FIG. 1. An imaging device 6 is disposed in a center portion 5 of the dashboard 4. The imaging device 6 incorporates an imaging element such as a charge coupled device (CCD) or a CMOS image sensor (CIS). The imaging device 6 outputs an image imaged by the imaging element to an ECU 20.

As the imaging device 6, any type of camera can be adopted. For example, a monocular camera, a stereo camera, a visible light camera, an infrared camera, a TOF distance image camera, or the like can be adopted as the imaging device 6.

The imaging device 6 images the passenger in the vehicle room 3. In the imaging device 6, an orientation, an angle of view, and a disposition position are determined such that at least the face of the passenger of the detection object of the passenger information can be imaged.

Figure 4:
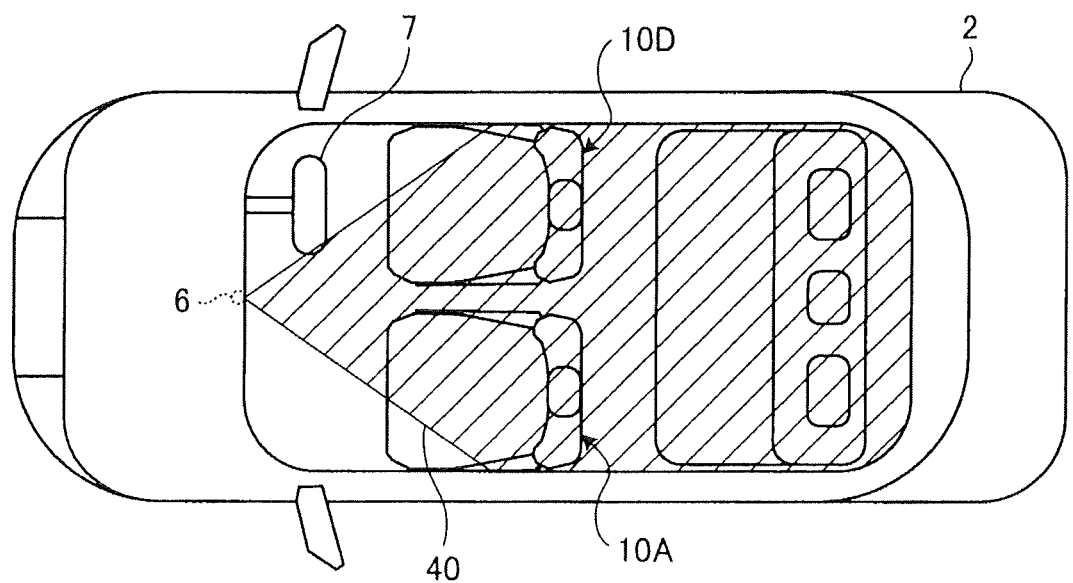
FIG. 4 is a diagram illustrating an example of an imaging range of an imaging device of the first embodiment.

FIG. 4 is a diagram illustrating an example of an imaging range of the imaging device 6 of the first embodiment. The imaging device 6 can hold an object within a range indicated by a hatched portion 40 in the image. The seat 10A is included in the imaging range, and the imaging device 6 can image the face of the passenger sitting on the seat 10A. In an example of FIG. 4, the seat 10D and the back seat are included in the imaging range.

The disposition position of the imaging device 6 is not limited to the center portion 5 of the dashboard 4. The imaging device 6 can be provided with a rearview mirror, a ceiling, or the like. In addition, in a case where the detection object of the passenger information is the passenger on the seat 10D, the imaging device 6 can be provided on a steering wheel column or the like. In addition, a plurality of imaging devices 6 can be provided.

Figure 5:
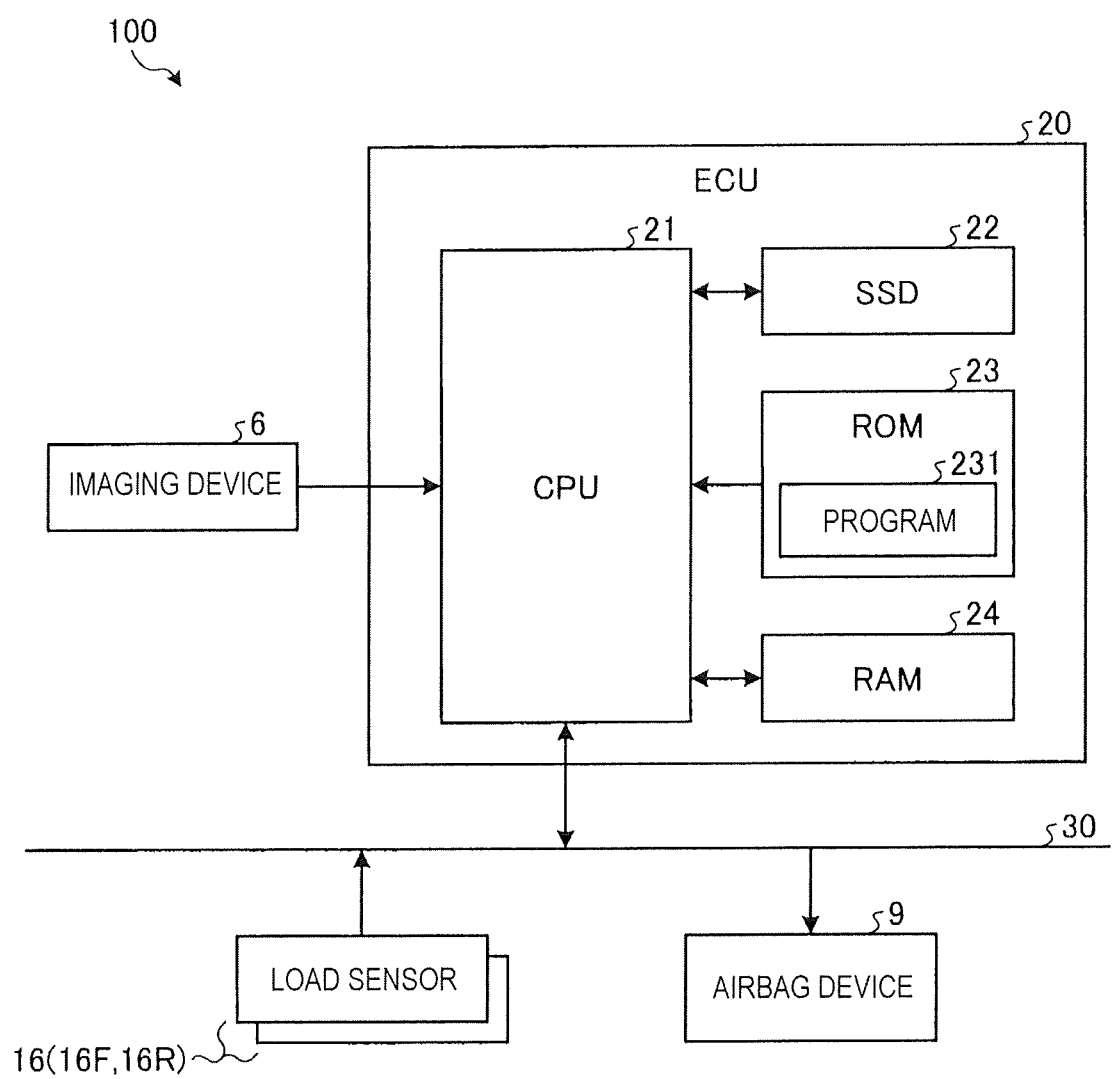
FIG. 5 is a block diagram illustrating an example of a configuration of a control system of the first embodiment.

A control system 100 is provided on the vehicle 1. FIG. 5 is a block diagram illustrating an example of a configuration of the control system 100 of the first embodiment. The control system 100 includes the imaging device 6, an airbag device 9, the load sensors 16 (16F and 16R), the ECU 20, and an in-vehicle network 30. The imaging device 6, the airbag device 9, the load sensors 16 (16F and 16R), and the ECU 20 are connected to the in-vehicle network 30. The ECU 20 receives an image output from the imaging device 6. In addition, the ECU 20 can receive the detection value of the load by the load sensors 16 (16F and 16R) via the in-vehicle network 30.

The airbag device 9 protects the passenger in the vehicle 1 from being impacted by deploying the airbag when the vehicle 1 collides, or the like. The airbag device 9 is built in, for example, the dashboard 4 or the like. The ECU 20 transmits a control signal via the in-vehicle network 30 to control the deployment of the airbag built in the airbag device 9.

The ECU 20 is an example of the passenger information detection device. The ECU 20 as the passenger information detection device detects passenger information on the passenger on the seat 10A based on the image imaged by the imaging device 6 and the detection value of the load by the load sensors 16 (16F and 16R).

The passenger information is information on a body size of the passenger. In the first embodiment, as an example, the passenger information is identification information for determining whether the passenger is the child, more specifically, identification information whether the passenger is the child or the adult. The passenger information is used for various types of controls. Here, an example in which the passenger information is used for deployment control of the airbag will be described.

The ECU 20 can realize the various types of control functions of the vehicle 1 in addition to a function as the passenger information detection device. The deployment control of the airbag is an example thereof. The ECU 20 can execute control of a brake system, control of a steering system, or the like.

The ECU 20 includes, for example, a central processing unit (CPU) 21, a solid state drive (SSD) 22, a read only memory (ROM) 23, a random access memory (RAM) 24, or the like. The CPU 21 is an arithmetic device, and the SSD 22, the ROM 23, and the RAM 24 are storage devices. That is, the ECU 20 includes a computer hardware configuration.

The ECU 20 may be configured by a plurality of computers. In this example, the ECU 20 is configured by one computer.

The CPU 21 executes a program 231 installed and stored in a nonvolatile storage device such as the ROM 23 to realize the function as the passenger information detection device. The RAM 24 temporarily stores various data items used in the calculation in the CPU 21. In addition, the SSD 22 is a rewritable nonvolatile storage device, and can store data even in a case where a power supply of the ECU 20 is turned off. The CPU 21, the ROM 23, the RAM 24, and the like can be integrated in the same package. In addition, the ECU 20 may be configured to use another logic operation processor such as a digital signal processor (DSP), a logic circuit, or the like instead of the CPU 21. A hard disk drive (HDD) may be provided instead of the SSD 22, and the SSD 22 and the HDD may be provided separately from the ECU 20.

The program 231 can be provided by being recorded in a computer-readable recording medium such as a CD-ROM, a flexible disk (FD), a CD-R, a digital versatile disk (DVD), or a flash memory, in a file that can be installed on a computer or in an executable format.

In addition, the program 231 may have a configuration that the program 231 is stored on a computer connected to the network such as the Internet and provided by being downloaded via the network. In addition, the program 231 can be provided and distributed via the network such as the Internet.

In addition, the program 231 can be provided by being incorporated in the ROM 23 or the like.

Figure 6:
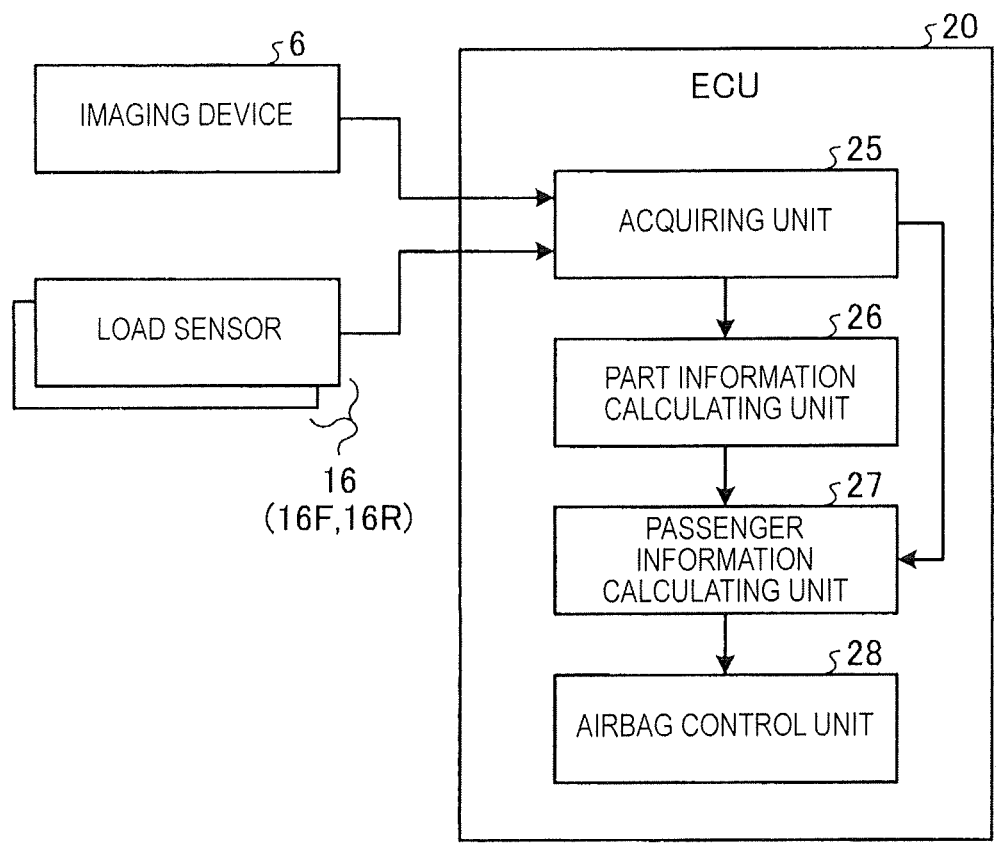
FIG. 6 is a block diagram illustrating a functional configuration of an ECU of the first embodiment.

FIG. 6 is a block diagram illustrating a functional configuration of the ECU 20 of the first embodiment. The ECU 20 functions as an acquisition unit 25, a part information calculation unit 26, a passenger information calculation unit 27, and an airbag control unit 28. The CPU 21 reads out and executes the program 231 from the ROM 23 to realize the function as the acquisition unit 25, the part information calculation unit 26, and the passenger information calculation unit 27. Here, a description that the CPU 21 also realizes the function as the airbag control unit 28 based on the program 231 will further be made. However, the program for realizing the function as the airbag control unit 28 may be realized by a program other than the program 231.

The acquisition unit 25 acquires the image output from the imaging device 6. In addition, the acquisition unit 25 acquires the detection value of the load output from the load sensors 16 (16F and 16R).

The part information calculation unit 26 calculates information on the face of the passenger from the image from the imaging device 6. The information on the face of the passenger is, specifically, a position of a face (face coordinates) and a tilt of the face (a face angle). The part information calculation unit 26 identifies the face of the passenger that is the detection object to the passenger information and calculates the face coordinates and the face angle.

The passenger information calculation unit 27 calculates the passenger information based on the information on the face of the passenger and the detection value of the load. Specifically, the passenger information calculation unit 27 corrects the acquired detection value of the load based on the position and the tilt of the face calculated by the part information calculation unit 26. An algorithm of correction will be described below. The passenger information calculation unit 27 determines whether the passenger is the adult or the child based on the corrected load. The passenger information calculation unit 27 outputs the determination result as the passenger information.

The airbag control unit 28 controls deployment of the airbag based on the passenger information output from the passenger information calculation unit 27. In a case where the passenger is the child, there is concern that the damage may become larger at the time of collision of the vehicle 1 due to the deployment of the airbag. The airbag control unit 28 determines whether the passenger is the child based on the detected passenger information. In a case where it is determined where the passenger is the child, the airbag control unit 28 sets the airbag not to be deployed.

A part or the whole of the functional configuration portion (the acquisition unit 25, the part information calculation unit 26, the passenger information calculation unit 27, and the airbag control unit 28) as the passenger information detection device may be realized by a hardware circuit instead of the CPU 21.

Figure 7:
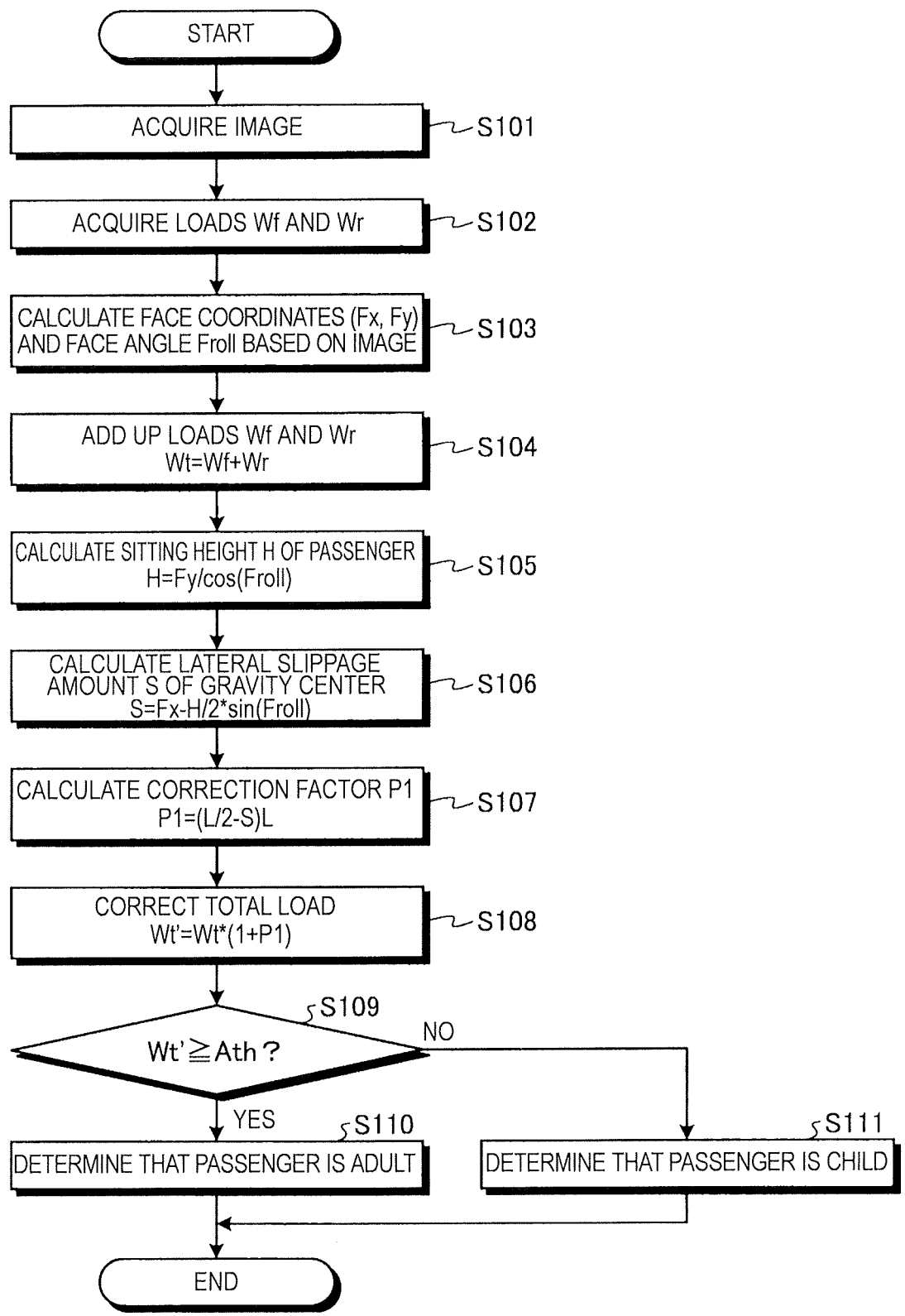
FIG. 7 is a flowchart illustrating a procedure of calculation of passenger information by the ECU of the first embodiment.

FIG. 7 is a flowchart illustrating a procedure of calculation of passenger information by the ECU 20 of the first embodiment.

First, the acquisition unit 25 acquires an image output from the imaging device 6 (S101). In addition, the acquisition unit 25 acquires the detection values of the load output from the load sensors 16 (16F and 16R) (S102). The detection value of the load sensor 16F is represented as a load Wf or simply as Wf. The detection value of the load sensor 16R is represented as a load Wr or simply as Wr.

Subsequently, the part information calculation unit 26 calculates the face coordinates and the face angle based on the acquired image (S103).

As a method of calculating the face coordinates and the face angle, an arbitrary method can be adopted. As a method of calculating the face coordinates and the face angle, an existing method can be adopted, and an arbitrary method to be developed in the future can be adopted.

In an example, the part information calculation unit 26 first extracts an outline from the image by, for example, applying an SOBEL filter or the like to the image. The part information calculation unit 26 detects a face appearing in the image by a method such as collating the extracted outline with a prepared pattern in advance. The part information calculation unit 26 extracts one or more feature points from the detected face.

Figure 8:
FIG. 8 is a diagram illustrating an example of a feature point to be extracted by the ECU of the first embodiment.

FIG. 8 is a diagram illustrating an example of a feature point. FIG. 8 is obtained by cutting out the image of a portion, in which the passenger sitting on the seat 10A, is imaged from the image acquired from the imaging device 6. In an example of FIG. 8, roots of left and right eyebrows 51, inner corners of left and right eyes 52, outer corners of the left and right eyes 53, and left and right corners of a mouth 54 of the passenger are extracted as feature points.

The part information calculation unit 26 calculates the face coordinates based on the positional relationship between the extracted feature points. In an example, the face coordinates are coordinates of a center portion 55 of the face. In addition, the part information calculation unit 26 calculates the face angle based on the positional relationship between the extracted feature points.

A coordinate system serving as a reference of the face coordinates and the face angle can be arbitrarily set. The part information calculation unit 26 converts each position in the image to a position in a predetermined coordinate system at an arbitrary stage.

Figure 9:
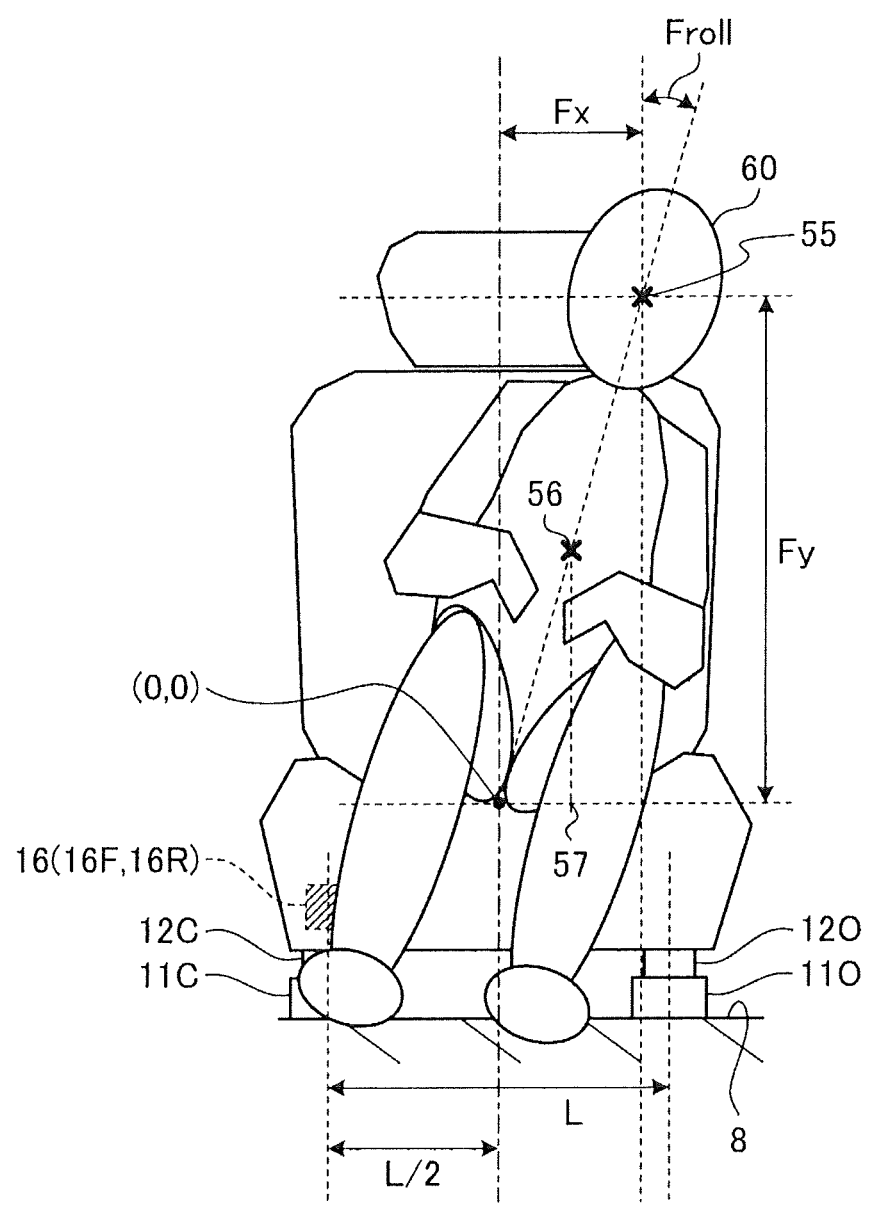
FIG. 9 is a diagram illustrating an example of a coordinate system to be used by the ECU of the first embodiment.

Here, as illustrated in FIG. 9, an orthogonal coordinate system that a door side orientation of the vehicle 1 in the lateral direction (that is, the orientation away from the disposition position of the load sensor 16) is defined as a positive orientation of an x-axis, and an upper orientation of the vehicle 1 in the vertical direction is defined as a positive orientation of a y-axis, on the seat, and an origin (0, 0) is set at a position where the distance to the support position by the left and right upper rails 12 is an equal interval is used. The part information calculation unit 26 calculates coordinates (Fx, Fy) of the center portion 55 of the face in the coordinate system illustrated in FIG. 9, as the face coordinates. In addition, the part information calculation unit 26 calculates a roll angle Froll as the face angle.

In an example of FIG. 9, a passenger 60 is in a posture where the upper body is tilted toward the door side (that is, the positive direction of the x-axis), and the angle of the tilt of the trunk portion is equal to the roll angle Froll of the face. In the subsequent processing, the detection value of the load is corrected on the assumption that the tilt angle of the trunk portion becomes equal to the roll angle Froll of the face in a case where the passenger 60 tilts the upper body in the lateral direction. This assumption is only an example, and any other arbitrary assumption can be adopted.

The part information calculation unit 26 sends the calculated face coordinates (Fx, Fy) and the calculated face angle Froll to the passenger information calculation unit 27.

The passenger information calculation unit 27 calculates a total value of the detection values of two load sensors 16 (16F and 16R) based on Equation (1) below (S104). The total value of the detection values of two load sensors 16 (16F and 16R) is represented as a load Wt, or simply as Wt.

$$Wt=Wf+Wr \quad (1)$$

Here, in a case where the passenger is seated on the seat 10A, since a connecting portion of the passenger and the seat 10A has a range, the load of the passenger is distributed to the range. In a case where the passenger is seated in the position of the origin without tilting the upper body in the lateral direction, the center of gravity of the distributed load acting on the seat 10A (more specifically, the x-axis component of the center of gravity) is considered to coincide with the origin. The center of gravity of the distributed load acting on the seat WA is the acting position of a concentrated load such that the value of the load Wt does not change in a case where the distributed load acting on the seat 10A is replaced by the concentrated load to act on the seat surface. On the other hand, in the first embodiment, the seat portion 13 is supported by the left and right upper rails 12. The load applied to the seat portion 13 is distributed to the left and right upper rails 12. The load sensors 16 (16F and 16R) are provided on the upper rail 12C on one side. Accordingly, in a case where the passenger is seated in the position of the origin without tilting the upper body in the lateral direction, Wt is a half of an integrated value of the distributed load acting on the seat 10A. The posture where the passenger sits at the position of the origin without tilting the upper body in the lateral direction is represented as a standard posture.

In a case where the upper body of the passenger is tilted in the lateral direction or the passenger sits in a position shifting from the origin, since the center of gravity of the distributed load acting on the seat 10A is shifted from the origin in the lateral direction, Wt is shifted from the half of the integrated value of the distributed load acting on the seat 10A. By correcting the shifting of the load Wt generated according to the shifting of the posture from the standard posture, the passenger information calculation unit 27 estimates the load Wt in a case where it is assumed that the passenger is seated in the standard posture.

Specifically, the passenger information calculation unit 27 first calculates a sitting height of the passenger (S105). The calculated value of the sitting height is represented by a sitting height H, or simply as H. As an example, the sitting height H is calculated based on Equation (2) below.

$$H=Fy/\cos(Froll) \quad (2)$$

Subsequently, the passenger information calculation unit 27 calculates a lateral shift length of the center of gravity of the distributed load acting on the seat 10A (S106). The lateral shift length of the center of gravity of the distributed load acting on the seat 10A is an amount indicating how much the x-axis component of the center of gravity of the distributed load acting on the seat 10A shifts from the origin. Hereinafter, the lateral shift length of the center of gravity of the distributed load acting on the seat 10A is represented as a lateral shift length S, or simply as S.

Specifically, the passenger information calculation unit 27 calculates the lateral shift length S based on Equation (3) below.

$$S=Fx-H/2*\sin(Froll) \quad (3)$$

As clear from Equation (3), it is assumed that a position 57 of a foot of perpendicular drawn from a center of a line segment 56 connecting the sitting position and the center portion 55 of the face to the x-axis is the center of gravity of the distributed load acting on the seat 10A. This assumption is an example, and the position of the center of gravity of the distributed load acting on the seat 10A can be calculated by an arbitrary method.

Subsequently, the passenger information calculation unit 27 calculates a correction factor P1 of the load Wt based on the lateral shift length S (S107). Specifically, the passenger information calculation unit 27 calculates the correction factor P1 by using Equation (4) below. Where, L is a distance between support positions by the left and the right upper rails 12.

$$P1=(L/2-S)/L \quad (4)$$

The passenger information calculation unit 27 corrects the load Wt by Equation (5) below (S108).

$$Wt'=Wt*(1+P1) \quad (5)$$

The load Wt' obtained by Equation (5) is an estimated value of the load Wt obtained in a case where it is assumed that the passenger is seated in a standard posture.

As described above, the passenger information calculation unit 27 corrects the load Wt based on the relationship between the center of gravity of the distributed load acting on the seat 10A and the position of the load sensors 16 (16F and 16R) by the processes of S106 and S107.

Correction algorithms represented by Equations (4) and (5) are an example. The correction algorithms are not limited above. The correction algorithm can be deformed according to the position of each load sensor 16, the support position of the seat portion 13, the assumption to be introduced, and the like.

Subsequently, the passenger information calculation unit 27 calculates the passenger information of the passenger based on the corrected load WV. Here, as an example, the passenger information calculation unit 27 determines whether the passenger is the adult or the child by comparison of the corrected load Wt' and a predetermined threshold value Ath.

Specifically, the passenger information calculation unit 27 determines whether the corrected load Wt' is a value equal to or more than the threshold value Ath (S109). In a case where the passenger information calculation unit 27 determines that the corrected load Wt' is a value equal to or more than the threshold value Ath (S109, Yes), the passenger information calculation unit 27 determines that the passenger is the adult (S110). In a case where the passenger information calculation unit 27 determines that the corrected load Wt' is a value less than the threshold value Ath (S109, No), the passenger information calculation unit 27 determines that the passenger is the child (S111).

A process in a case where the corrected load Wt' is equal to the threshold value Ath is not limited above. In a case where the corrected load Wt' is equal to the threshold value Ath, it may be determined that the passenger is the child.

After the process of S110 or S111, the operation of the calculation of passenger information is completed. The passenger information calculation unit 27 sends the determination result to the airbag control unit 28 as the passenger information.

Figure 10:
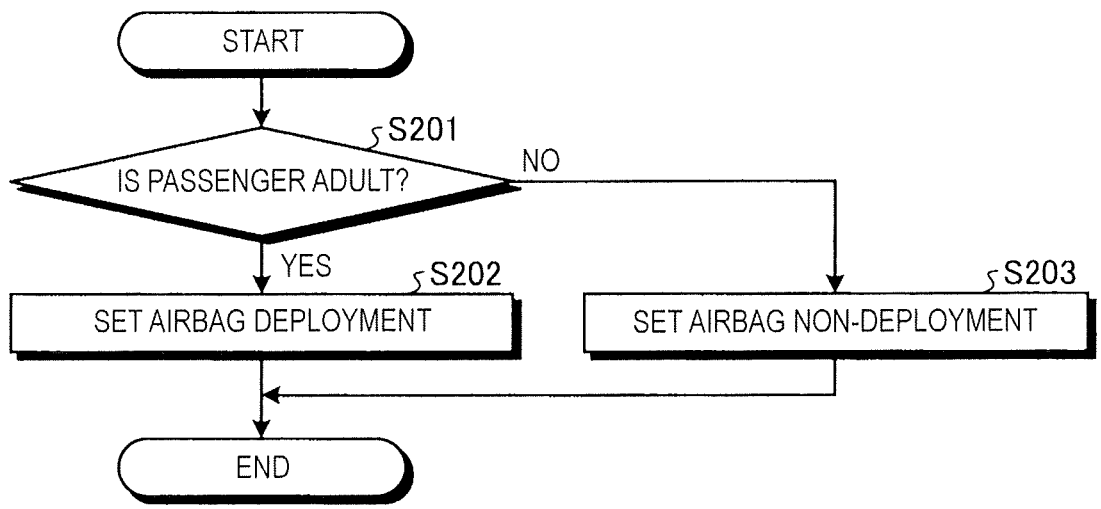
FIG. 10 is a flowchart illustrating a procedure of control of an airbag device by the ECU of the first embodiment.

FIG. 10 is a flowchart illustrating a procedure of control of the airbag device 9 by the ECU 20 of the first embodiment.

The airbag control unit 28 determines whether the passenger is the adult based on the passenger information (S201). In a case where it is determined that the passenger is the adult (S201, Yes), the airbag control unit 28 sets "airbag deployment" as an operation mode of the airbag device 9 (S202). The operation mode of "airbag deployment" is an operation mode in which the airbag is deployed in the airbag device 9 in a case where an event requiring protection of the passenger such as a collision of the vehicle 1 occurs.

On the other hand, in a case where it is determined that the passenger is not adult (S201, No), the airbag control unit 28 sets "airbag non-deployment" as the operation mode of the airbag device 9 (S203). The operation mode of the "airbag non-deployment" is an operation mode in which the airbag is not deployed in the airbag device 9 in a case where the event requiring protection of the passenger occurs.

After the operation mode of the airbag device 9 is set by the process of S202 or S203, the operation of control of the airbag device 9 is finished.

In the above description, it is described that the passenger information calculation unit 27 corrects the load Wt and determines whether the passenger is the adult or the child based on the comparison of the corrected load Wt and the threshold value Ath. The passenger information calculation unit 27 does not correct the load Wt and may correct the threshold value Ath that is the determination standard instead of correction of the load Wt.

In addition, in the above description, it is described that the passenger information is identification information indicating whether the passenger is the adult or the child. An example of the passenger information is not limited thereto.

Figure 11:
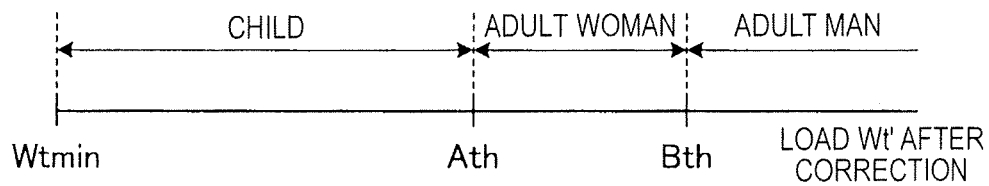
FIG. 11 is a diagram illustrating another example of the passenger information of the first embodiment.

For example, the passenger information indicates whether the passenger is an adult man, an adult woman, or a child. In an example, the threshold value Ath and a threshold value Bth greater than the threshold value Ath are preset in the passenger information calculation unit 27. As illustrated in FIG. 11, in a case where the corrected load Wt' is included in a range from a lower limit value Wtmin of the load detection range to the threshold value Ath, the passenger information calculation unit 27 determines that the passenger is the child, in a case where the corrected load Wt' is included in a range from the threshold value Ath to the threshold value Bth, the passenger information calculation unit 27 determines that the passenger is the adult woman, and in a case where the corrected load Wt' exceeds the threshold value Bth, the passenger information calculation unit 27 determines that the passenger is the adult man. In a case where the passenger is the child, the airbag control unit 28 sets the mode to "airbag non-deployment", in a case where the passenger is the adult woman, the airbag control unit 28 sets the mode to "weak airbag deployment", and in a case where the passenger is the adult man, the airbag control unit 28 sets the mode to "airbag deployment". The operation mode of the "weak airbag deployment" is an operation mode in which the deployment speed of the airbag is slower than that of the operation mode of "airbag deployment".

In another example, the passenger information calculation unit 27 may output the corrected load Wt' as the passenger information. The airbag control unit 28 sets the operation mode based on the comparison of the corrected load WV and the threshold value Ath.

In addition, the passenger information is described as being used for deployment control of the airbag. The passenger information can be used for control other than the deployment control of the airbag.

For example, there is a case where the support position of a seat belt can be controlled by the ECU 20. The ECU 20 may control the support position of the seat belt based on the passenger information. For example, in a case where it is determined that the passenger is the child, the ECU 20 controls the support position at the door side of the seat belt to a lower position than a case where the passenger is the adult.

In addition, in the above-description, it is described that the part information calculation unit 26 calculates face coordinates (Fx, Fy) and a face angle Froll as information on the face of the passenger. The information on the face of the passenger is not limited thereto.

For example, the part information calculation unit 26 may calculate only the face coordinates as information on the face of the passenger. In this case, for example, the passenger information calculation unit 27 calculates an intermediate point between an x-axis component Fx of the face coordinates and origin as the center of gravity of the distributed load acting on the seat 10A. It is based on the assumption that the passenger is seated at the origin of the seat surface. In this manner, the information on the face of the passenger can be variously modified according to the assumption to be introduced.

In another example of the information on the face of the passenger, the part information calculation unit 26 calculates a roll angle Froll, a pitch angle Fpitch, and a yaw angle Fyaw as the face angle. The passenger information calculation unit 27 calculates a three-dimensional tilt of the upper body of the passenger with reference to the perpendicular direction of a seat surface, based on the pitch angle Fpitch and the yaw angle Fyaw. The part information calculation unit 26 adopts the calculated tilt instead of Froll of Equation (2) or Equation (3).

In still another example of the information on the face of the passenger, the part information calculation unit 26 may calculate the face coordinates (Fx, Fy, Fz) in the orthogonal coordinate system having a z-axis in addition to the x-axis and the y-axis. The passenger information calculation unit 27 may calculate the sitting height H by further using a z-axis component Fz of the face coordinates.

As described above, in the first embodiment, the passenger information detection device calculates the information on the face of the passenger from the image imaged by the imaging device 6 (S103). The passenger information detection device calculates the information on a body size of the passenger based on the information on the face of the passenger and the detection value of the load sensors 16 (16F and 16R) provided on the seat 10A (S105 to S111).

Accordingly, when processing of the detection value of the load sensors 16 (16F and 16R), since it is possible to perform the correction based on the information on the face of the passenger calculated from the image from the imaging device 6, it is possible to estimate the body size of the passenger with high accuracy. That is, the detection accuracy of the passenger information is improved.

In addition, the passenger information detection device calculates the face angle and the face coordinates as the information on the face of the passenger (S103). The passenger information detection device calculates the sitting height of the passenger based on the face coordinates and the face angle (S105) and calculates a center of gravity of the distributed load acting on the seat 10A based on the sitting height and the tilt of the head portion (S106). The passenger information detection device executes the correction based on a positional relationship between the calculated center of gravity and the load sensors 16 (16F and 16R) with respect to the load Wt (S107 and S108).

Accordingly, since a variation in the load Wt generated in a case where the passenger is in a posture where the upper body is tilted in the lateral direction or the sitting position of the passenger is varied is corrected, it is possible to reduce the influence of the posture of the passenger on the detection result. That is, the detection accuracy of the passenger information is improved.

As described above, the passenger information detection device calculates only the face coordinates as the information on the face of the passenger, calculates the center of gravity of the distributed load acting on the seat 10A based on the face coordinates, and may perform correction based on the relationship between the center of gravity of the distributed load acting on the seat 10A and the position of the load sensors 16 (16F and 16R). In this case, the variation in the sitting position of the passenger is not considered. However, since the variation in the load Wt generated in a case where the passenger is in the posture where the upper body is tiled in the lateral direction is corrected, it is possible to reduce the influence of the posture of the passenger on the detection result. That is, the detection accuracy of the passenger information is improved.

In addition, in an example, the passenger information is identification information for determining whether the passenger is the child, the passenger information detection device determines whether the passenger is the child based on the comparison of the corrected load WV and the threshold value Ath. Thus, when processing of the detection value of the load, since it is possible to perform the correction based on the information on the face of the passenger, the detection accuracy of whether the passenger is the child is improved.

In addition, the program 231 causes a computer such as the ECU 20 to execute procedures of acquiring an image imaged by the imaging device 6 and the detection values of the load sensors 16 (16F and 16R) (S101, S102, and S104), a procedure of calculating the information of the face of the passenger from the image (S103), and a procedure of calculating the information on a body size of the passenger based on the information on the face of the passenger and the detection values of the load sensors 16 (16F and 16R) (S105 to S111).

Accordingly, when processing of the detection values of the load sensors 16 (16F and 16R), since it is possible to perform the correction based on the information on the face of the passenger calculated from the image from the imaging device 6, it is possible to estimate the body size of the passenger with good accuracy. That is, the detection accuracy of the passenger information is improved.

Second Embodiment

When the passenger is leaning on the door, the load to be applied to the seat portion 13 is dispersed to the door. In this case, even when the load Wt is corrected according to the algorithm exemplified in the first embodiment, the corrected load Wt' becomes smaller than the load Wt in a case where the passenger is seated in a standard posture.

In the second embodiment, in a case where the load is distributed in the door, the passenger information calculation unit 27 further corrects the load Wt such that the corrected load Wt' becomes the greater value.

As a method for estimating whether the load is distributed in the door, various types of methods are considered. However, here, as an example, a method for estimating whether the load is distributed in the door based on the position of the face will be described.

In a case where the distance between the position of the face and the door is smaller than a threshold value Cth, the passenger information calculation unit 27 further corrects a value greater than the load Wt based on the estimation that the passenger is in contact with the door. The threshold value Cth is a maximum value of the position of the face that can be determined that the passenger is in contact with the door, and is determined by experiment or calculation, for example. The threshold value Cth is preset in the passenger information calculation unit 27. Here, a difference between the x-axis component of the position of the face and the x-axis component of the position of the door is treated as a distance between the position of the face and the door. However, the definition of the distance between the position of the face and the door is not limited thereto.

Figure 12:
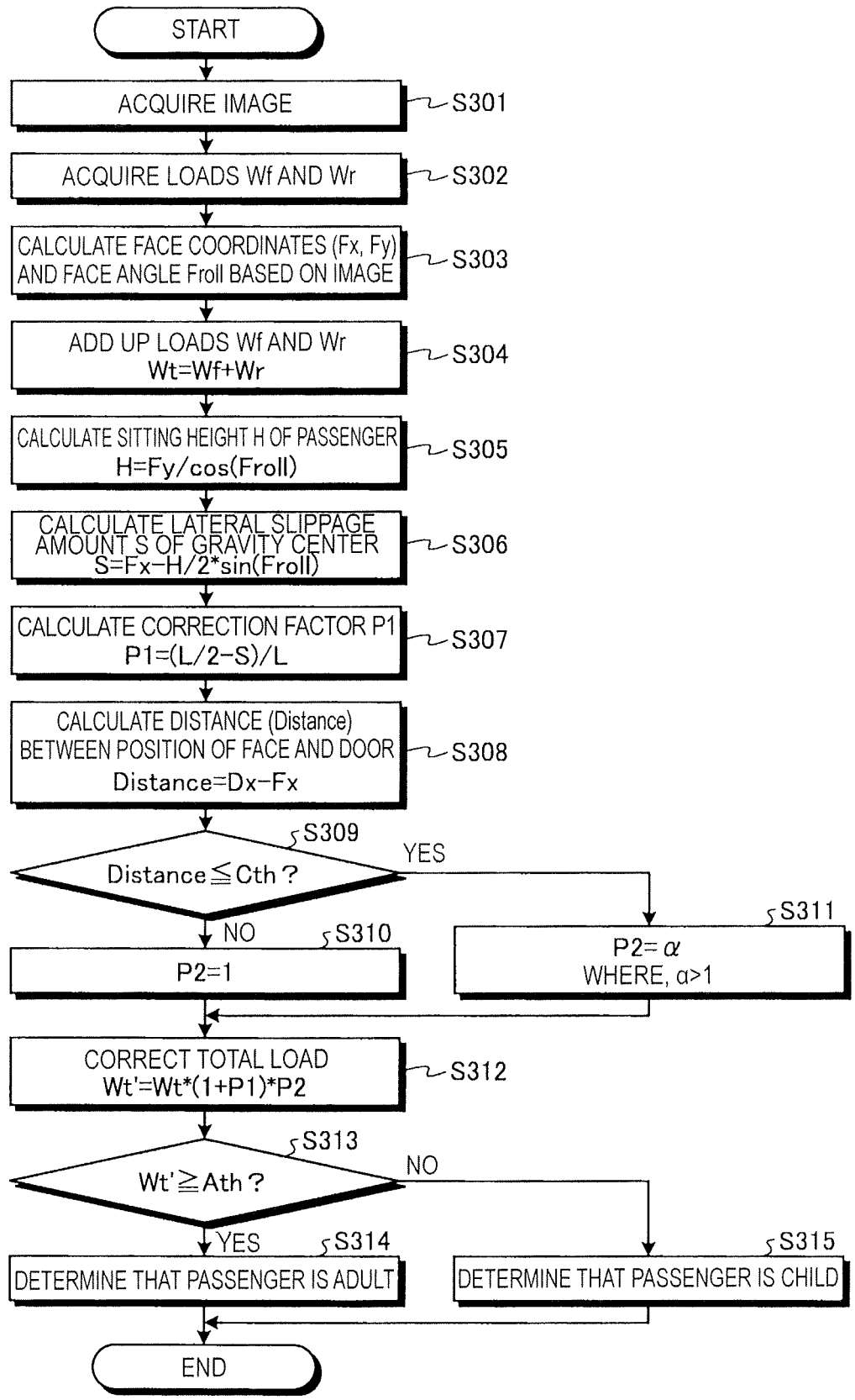
FIG. 12 is a flowchart illustrating a procedure of calculation of passenger information by an ECU of a second embodiment.

FIG. 12 is a flowchart illustrating a procedure of calculation of passenger information by the ECU 20 of the second embodiment.

First, in processes in S301 to S307, the same processes as that of S101 to S107 are executed.

After processing of S307, the passenger information calculation unit 27 estimates whether the passenger is in contact with the door, and determines a correction factor P2 that is a coefficient for correction based on the estimation result.

That is, the passenger information calculation unit 27 calculates the distance between the position of the face and the door by Equation (6) below (S308). A distance between the position of the face and the door is represented as a distance Distance, or simply as, Distance.

$$\text{Distance}=Dx-Fx \tag{6}$$

Here, Dx is the x-axis component of the position of the door. Dx is preset in the passenger information calculation unit 27.

Subsequently, the passenger information calculation unit 27 determines whether the distance Distance is equal to or less than the threshold value Cth (S309). The process corresponds to the process of determining whether the passenger is in contact with the door.

In a case where it is determined that the distance Distance is greater than the threshold value Cth (S309, No), it can be estimated that the passenger is not in contact with the door. In this case, the passenger information calculation unit 27 sets the correction factor P2 to 1 (S310).

In a case where it is determined that the distance Distance is a value smaller than the threshold value Cth (S309, Yes), it can be estimated that the passenger is in contact with the door. In this case, the passenger information calculation unit 27 sets the correction factor P2 to α (S311).

α is a value greater than 1. α may be a constant and may be variably configured. In an example that α is variably configured, as the distance Distance becomes smaller, the relationship between α and the distance Distance is defined such that α becomes greater. Since as the distance Distance becomes smaller, it can be considered that more loads are distributed to the door, it is because the correction amount to be greater is increased as the load distributed to the door increases.

A process in a case where the distance Distance is equal to the threshold value Cth is not limited above. In a case where it is determined that the distance Distance is equal to the threshold value Cth, a process in S310 may be executed.

After S310 or S311, the load Wt is corrected by Equation (7) (S311).

$$Wt' = Wt*(1+P1)*P2 \qquad (7)$$

Since in a case where it is estimated that the passenger is in contact with the door, a value greater than 1 is set as P2, the load Wt is corrected so as to have a greater value by Equation (7). Accordingly, it is possible to correct the decrease in the load Wt caused by the passenger touching the door.

After processing in S312, the passenger information calculation unit 27 calculates the passenger information of the passenger based on the corrected load Wt'. That is, processes equivalent to S109 to S111 are executed in S313 to S315. The calculation of the passenger information is completed.

It is also considered that a part of the upper body of the passenger is in contact with a center console by the passenger tilting the upper body to the side opposite to the door. In a case where the passenger is in contact with the center console, similar to a case where the passenger is in contact with the door, the load to be applied to the seat portion 13 is distributed to the center console. In a case where a distance between the center console and the position of the face is smaller than the threshold value, the passenger information calculation unit 27 may correct the load Wt to a greater value based on the estimation that the passenger is in contact with the center console.

In addition, in the above-described description, it is described that in a case where is it estimated that the passenger is in contact with the door, the load Wt is multiplied by the value a greater than 1 as a correction coefficient. The correction algorithm is not limited thereto. For example, in a case where it is estimated that the passenger is in contact with a fixed object such as the door, the center console or the like, a preset positive value may be added.

As described above, in the second embodiment, in a case where a distance between the position of the face of the passenger and the fixed object provided in the vehicle room 3 is smaller than the threshold value, the passenger information detection device corrects the value of the load Wt to a greater value (S309, S311, and S312).

Accordingly, since in a case where the passenger is in contact with the fixed object such as the door or the center console, the detection value of the load is corrected in consideration with the load distributed to the fixed object, it is possible to further reduce the influence of the posture of the passenger on the detection result. That is, the detection accuracy of the passenger information is more improved. The fixed object is not limited to the door or the center console.

As a method for estimating whether the passenger is in contact with the fixed object, various methods are considered in addition to the method by comparison of the distance between the position of the face and the fixed object and the threshold value.

For example, the part information calculation unit 26 calculates the position of an upper extremity of the passenger. The upper extremity is, for example, an upper arm, a forearm, a hand, or a combination thereof. Similar to the first embodiment, the part information calculation unit 26 may calculate, for example, the position of the upper extremity by extracting the feature point. Since in a case where a stereo camera or a TOF distance image camera is adopted as the imaging device 6, a three-dimensional shape of the passenger can be acquired, the part information calculation unit 26 may calculate the part of the upper extremity based on the three-dimensional shape of the passenger. The passenger information calculation unit 27 determines whether the upper arm is in contact with the fixed object based on the calculated position of the upper arm. The position of the fixed object is, for example, set in the passenger information calculation unit 27 in advance, and the passenger information calculation unit 27 determines whether the upper arm is in contact with the fixed object based on the comparison of the calculation value of the position of the upper arm and the position of the fixed object. By such a method, it is possible to estimate whether the passenger is in contact with the fixed object.

Third Embodiment

The backrest portion 14 is provided so as to be inclinable with respect to the seat portion 13. Accordingly, when the sitting height is calculated based on only the information on the face of the passenger, an error due to the tilt angle of the backrest portion 14 with respect to the seat portion 13 occurs. The tilt angle of the backrest portion 14 to the seat portion 13 is represented as a reclining angle, a reclining angle REC, or simply as REC.

Figure 13:
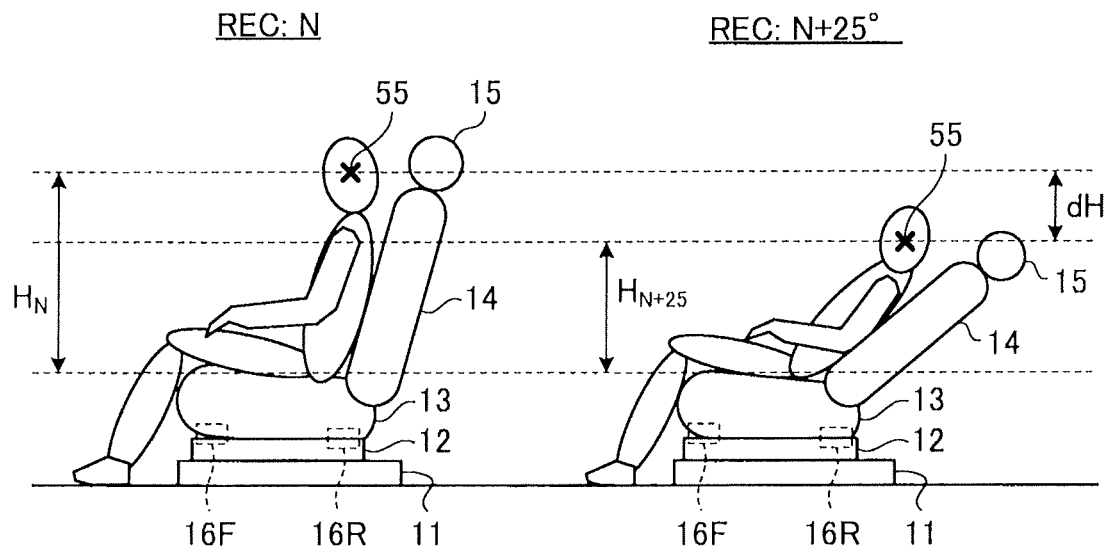
FIG. 13 is a diagram illustrating an error of a sitting height due to a reclining angle.

FIG. 13 is a diagram illustrating an error of the calculation value of a sitting height due to a reclining angle. In FIG. 13, in a case where the reclining angle is a reference angle (N degree), and in a case where the reclining angle is N+25 degrees greater than the reference angle by 25 degrees, a posture of the passenger in both cases is illustrated. In FIG. 13, it is assumed that the passenger is seated in a standard posture and leans the upper body against the backrest portion 14. In this case, the sitting height is estimated to be smaller by dH compared to a case where the reclining angle is N+25 degrees and a case where the reclining angle is N degree. This is because the upper body of the passenger tilts to the rear side of the vehicle 1 in the longitudinal direction as the reclining angle increases, and the y-axis component Fy of the face coordinates obtained from the image of the imaging device 6 decreases as a result. The error dH is propagated to the corrected load Wt causing deterioration in detection accuracy of the passenger information.

In addition, the passenger cannot lean against the backrest portion 14, and even in the case, the detection accuracy may be reduced due to the tilt of the upper body of the passenger in the longitudinal direction.

The tilt of the upper body of the passenger in the longitudinal direction affects the relationship between a detection value Wf of the load sensor 16F and a detection value Wr of the load sensor 16R. Since the center of gravity of the distributed load acting on the seat 10A moves rearward as the upper body of the passenger tilts rearward of the vehicle 1 in the longitudinal direction, the proportion occupied by the detection value Wr of the load sensor 16R among the load Wt increases.

In the third embodiment, the error of the calculation value of the sitting height due to the tilt of the upper body of the passenger in the longitudinal direction is corrected based on the proportion of the load Wr to the load Wt(=Wf+Wr). The proportion of the load Wr to the load Wt is an example of an index indicating a relationship between the detection value Wf of the load sensor 16F and the detection value Wr of the load sensor 16R.

Figure 14:
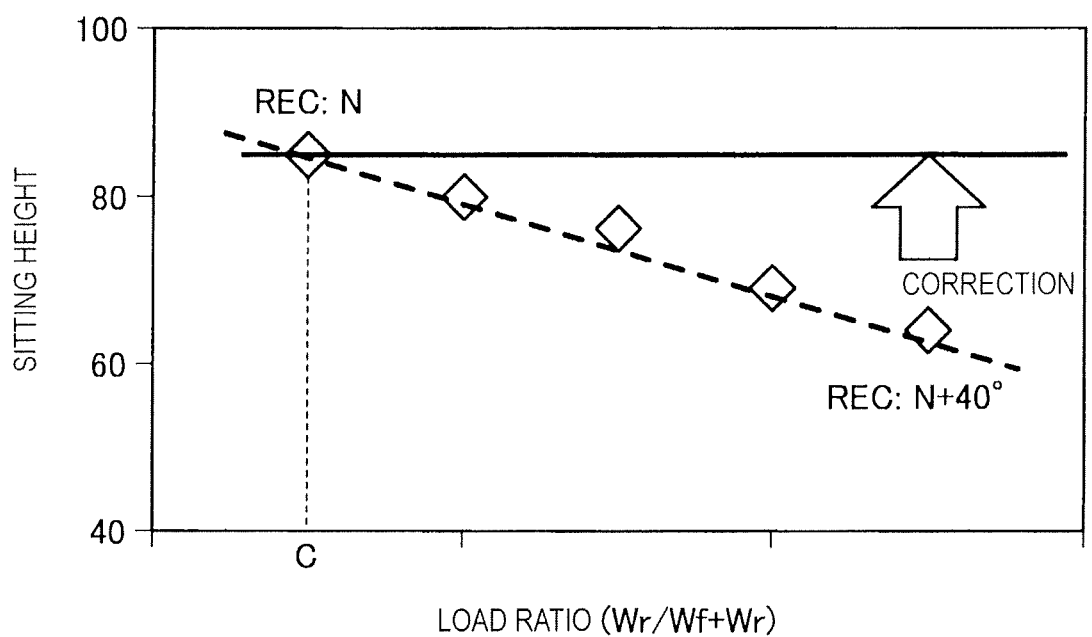
FIG. 14 is a diagram illustrating an algorithm for correction of a sitting height of a third embodiment.

FIG. 14 is a diagram illustrating an algorithm for correction of a sitting height. In FIG. 14, a horizontal axis represents a load ratio, and a vertical axis represents the sitting height before correction. The load ratio is the proportion of the load Wr to the load Wt. As the reclining angle increases, the sitting height before correction decreases and the load ratio increases, and the relationship between the sitting height before correction and the load ratio can be fitted to a linear function as illustrated by a dotted line. The passenger information calculation unit 27 estimates the sitting height H' in a case where the reclining angle is N degree and the passenger is seated in the standard posture by the correction of the sitting height. That is, the difference between the dotted line and the solid line in the vertical axis direction corresponds to the correction amount.

Figure 15:
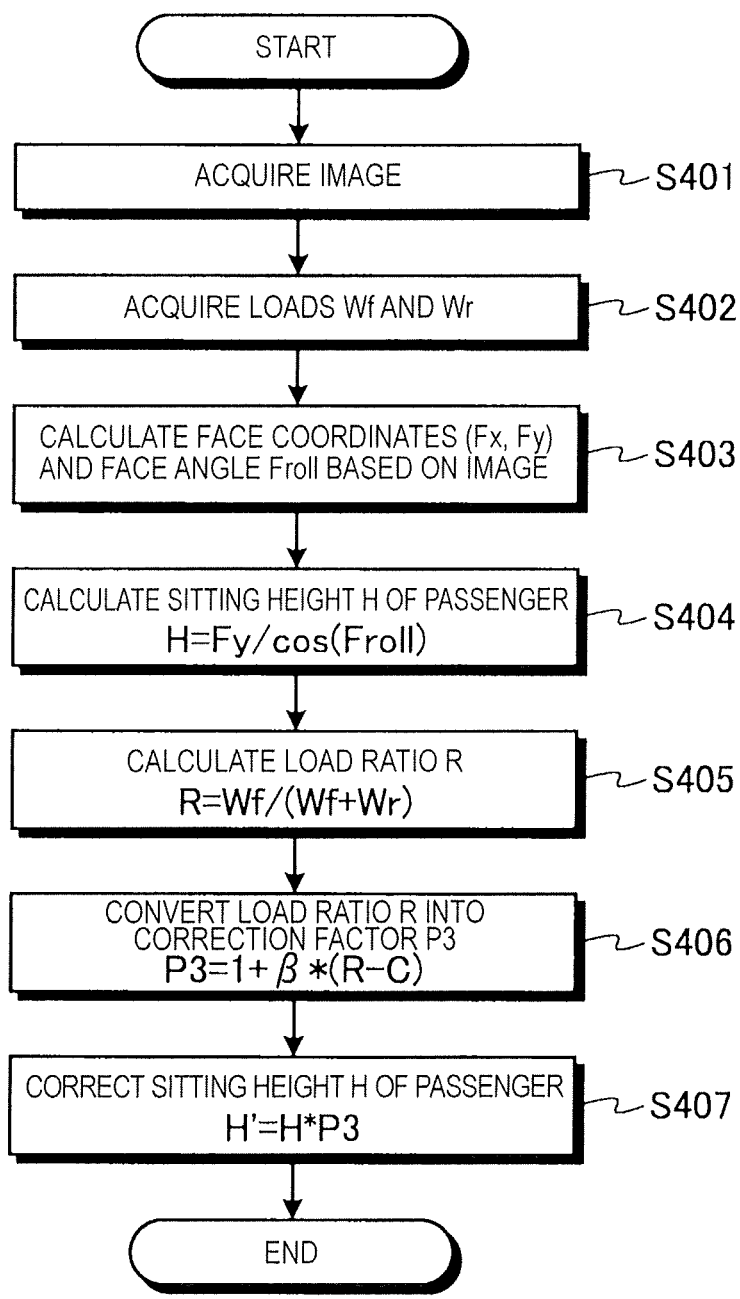
FIG. 15 is a flowchart illustrating a procedure of calculation of the sitting height by an ECU of the third embodiment.

FIG. 15 is a flowchart illustrating a procedure of calculation of the sitting height by the ECU 20 of the third embodiment.

First, in S401 to S403, the same processes as that of S101 to S103 are executed. The passenger information calculation unit 27 calculates the sitting height H of the passenger in the same procedures of S105 (S404). The sitting height H calculated in S404 is the sitting height before correction.

Subsequently, the passenger information calculation unit 27 calculates the load ratio by Equation (8) below (S405). The load ratio is represented as the load ratio R, simply as, R.

$$R = Wr/(Wf+Wr) \quad (8)$$

The passenger information calculation unit 27 converts the load ratio R to the correction factor P3 by Equation (9) below (S406) and corrects the sitting height H by Equation (10) below using a correction factor P3 (S407).

$$P3 = 1 + \beta*(R-C) \quad (9)$$

$$H' = H*P3 \quad (10)$$

However, as illustrated in FIG. 14, C is a constant, and is a value of the load ratio R in a case where the reclining angle is a reference angle (N degree). In addition, $\beta$ is a constant and is a positive value.

$\beta$ is calculated in advance by experiments or calculations so as to match the relationships of Equations (9) and (10) with the relationship shown in FIG. 14, and is preset in the passenger information calculation unit 27. Therefore, by using Equations (9) and (10), the passenger information calculation unit 27 uses the state in which the passenger is seated on the backrest portion 14 that is tilted at the reference angle (N degree) as a reference, and in a case where the passenger is seated with the upper body tilted in the longitudinal direction from the reference, it is possible to obtain an estimated value of the sitting height in a case where the occupant is seated in the reference state.

The passenger information calculation unit 27 can use the corrected sitting height H' instead of the sitting height H substituted into Equation (3).

As described above, in a third embodiment, the passenger information detection device corrects the calculation value of the sitting height H based on the relationship between the detection value of the load sensor 16F and the detection value of the load sensor 16R provided behind the load sensor 16F of the vehicle 1 in the longitudinal direction. Accordingly, the detection value Wt of the load can be corrected in consideration of a case where the passenger is in a posture where an upper body is tilted in a longitudinal direction of the vehicle. Thus, it is possible to reduce influence of the posture of the passenger on the detection result.

The passenger information calculation unit 27 may output the corrected sitting height H' obtained by the process of FIG. 15 as the passenger information.

In addition, the passenger information calculation unit 27 may determine whether the passenger is the child based on the corrected sitting height H'. For example, in a case where the corrected sitting height H' is smaller than the predetermined value, it is determined that the passenger is the child, and the corrected sitting height H' is greater than the predetermined value, the passenger information calculation unit 27 may determine that the passenger is not the child.

In addition, the passenger information calculation unit 27 may determine whether the passenger is the child based on the combination of the corrected sitting height H' and the corrected load Wt'. For example, in a case where the corrected sitting height H' is smaller than the predetermined value, and the corrected load Wt' is smaller than the threshold value Ath, the passenger information calculation unit 27 determines that the passenger is the child, and in a case where the corrected sitting height H' is greater than the predetermined value or the corrected load Wt' is greater than the threshold value Ath, the passenger information calculation unit 27 may determine that the passenger is not the child.

In addition, similar to the first embodiment, the use application of the passenger information is not limited to the deployment control of the airbag.

In the descriptions of the first to third embodiments, an execution algorithm of the passenger information calculation unit 27 is described using each various numeral expression. However, the passenger information calculation unit 27 may not need to perform calculation using the numeral expression. The passenger information calculation unit 27 may calculate various values using a lookup table that defines the relationship corresponding to the numerical expression or may derive various values by a simple conditional branch.

A passenger information detection device according to an aspect of this disclosure includes, as an example, an acquisition unit that acquires an image imaged by an imaging device that is provided in an interior space of a vehicle to image a passenger seated on a seat and a detection value of a load sensor provided on the seat, a first calculation unit that calculates first information that is information on a face of the passenger from the image, and a second calculation unit that calculates second information that is information on a body size of the passenger based on the first information and the detection value. When processing the detection value of the load sensor, correction can be performed based on the information on the face of the passenger, and thus detection accuracy of the passenger information is improved.

In the passenger information detection device according to the aspect of this disclosure, as an example, the first information includes a position of the face, and the second calculation unit calculates a center of gravity of a distributed load acting on the seat based on the position of the face, and corrects the detection value based on a relationship between the center of gravity and a position of the load sensor. Therefore, since the detection value of the load is corrected in consideration of a case where the passenger is in a posture where an upper body is tilted in a lateral direction of the vehicle, it is possible to reduce influence of the posture of the passenger on the detection result. That is, the detection accuracy of the passenger information is improved.

In the passenger information detection device according to the aspect of this disclosure, as an example, the first information further includes a tilt of the face, and the second calculation unit calculates a sitting height of the passenger based on the position of the face and the tilt of the face, and calculates the center of gravity based on the sitting height and the tilt of the face. Therefore, since the detection value of the load is corrected further in consideration of variation of a sitting position of the passenger, it is possible to further reduce the influence of the posture of the passenger on the detection result.

In addition, in the passenger information detection device according to the aspect of this disclosure, as an example, the load sensor includes a first load sensor and a second load sensor provided at a further rear side of the vehicle in a longitudinal direction than the first load sensor, and the second calculation unit corrects the calculated sitting height based on a relationship between the detection value of the first load sensor and the detection value of the second load sensor. Therefore, since the detection value of the load is corrected in consideration of a case where the passenger is in a posture where the upper body is tilted in a longitudinal direction of the vehicle, it is possible to further reduce the influence of the posture of the passenger on the detection result.

In the passenger information detection device according to the aspect of this disclosure, as an example, in a case where a distance between the position of the face and a fixed object provided on the vehicle is smaller than a first threshold value, the second calculation unit further corrects the detection value to become larger. Therefore, since the detection value of the load is corrected in consideration of a case where the passenger is in contact with the fixed object such as a door, it is possible to further reduce the influence of the posture of the passenger on the detection result.

In the passenger information detection device according to the aspect of this disclosure, as an example, the first calculation unit further calculates a position of an upper extremity of the passenger, and the second calculation unit determines whether the upper extremity is in contact with a fixed object other than the seat based on the position of the upper extremity, and in a case where it is determined that the upper extremity is in contact with the fixed object, the second calculation unit further corrects the detection value to become larger. Therefore, since the detection value of the load is corrected in consideration of a case where the passenger is in contact with the fixed object such as a door, it is possible to further reduce the influence of the posture of the passenger on the detection result.

In the passenger information detection device according to the aspect of this disclosure, as an example, the second information includes identification information for determining whether the passenger is a child, and the second calculation unit determines whether the passenger is the child based on a comparison of the corrected detection value and a second threshold value. Therefore, when processing the detection value of the load, since correction can be performed based on the information on the face of the passenger, detection accuracy of whether the passenger is the child is improved.

A program according to an aspect of this disclosure causes, for example, a computer to execute a procedure of acquiring an image imaged by an imaging device that is provided in an interior space of a vehicle to image a passenger seated on a seat and a detection value of a load sensor provided on the seat, a procedure of calculating information on a face of the passenger from the image, and a procedure of calculating information on a body size of the passenger based on the information and the detection value. When processing the detection value of the load sensor, since correction can be performed based on the information on the face of the passenger, detection accuracy of the passenger information is improved.

Hereinbefore, the embodiments of this disclosure have been described. The above-mentioned embodiment and modification examples are merely examples and do not intend to limit a scope of this disclosure. The embodiment or modification examples can be implemented in various other modes and various omissions, replacements, combinations, and changes can be made in a range without departing from the scope of this disclosure. In addition, the embodiments and the modification examples can be implemented while the configurations and the shapes in the embodiments and the modification examples are partially exchanged.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A passenger information detection device comprising:
an acquisition unit that acquires an image imaged by an imaging device that is provided in an interior space of a vehicle to image a passenger seated on a seat and a detection value of a load sensor provided on the seat;
a first calculation unit that calculates first information that is information including a position of a face of the passenger from the image; and
a second calculation unit that calculates second information that is information on a body size of the passenger based on the first information and the detection value,
wherein the second calculation unit calculates a center of gravity of a distributed load acting on the seat based on the position of the face, and corrects the detection value based on a relationship between the center of gravity and a position of the load sensor,
the first calculation unit further calculates a position of an upper extremity of the passenger, and the second calculation unit determines whether the upper extremity is in contact with a fixed object other than the seat based on the position of the upper extremity, and in a case where it is determined that the upper extremity is in contact with the fixed object, the second calculation unit further corrects the detection value to become larger.

2. The passenger information detection device according to claim 1,
wherein the first information further includes a tilt of the face, and
the second calculation unit calculates a sitting height of the passenger based on the position of the face and the tilt of the face, and calculates the center of gravity based on the sitting height and the tilt of the face.

3. The passenger information detection device according to claim 2,
wherein the load sensor includes a first load sensor and a second load sensor provided at a further rear side of the vehicle in a longitudinal direction than the first load sensor, and
the second calculation unit corrects the calculated sitting height based on a relationship between the detection value of the first load sensor and the detection value of the second load sensor.

4. The passenger information detection device according to claim 1,
wherein, in a case where a distance between the position of the face and a fixed object provided on the vehicle is smaller than a first threshold value, the second calculation unit further corrects the detection value to become larger.

5. The passenger information detection device according to claim 1,
wherein the second information includes identification information for determining whether the passenger is a child, and
the second calculation unit determines whether the passenger is the child based on a comparison of the corrected detection value and a second threshold value.

6. A non-transitory computer readable medium including a program for causing a computer to execute:
a procedure of acquiring an image imaged by an imaging device that is provided in an interior space of a vehicle to image a passenger seated on a seat and a detection value of a load sensor provided on the seat;
a first procedure of calculating information including a position of a face of the passenger from the image; and
a second procedure of calculating information on a body size of the passenger based on the information including the position and the detection value, wherein
the second procedure includes calculating a center of gravity of a distributed load acting on the seat based on the position of the face, and correcting the detection value based on a relationship between the center of gravity and a position of the load sensor,
the first procedure includes calculating a position of an upper extremity of the passenger, and
the second procedure includes determining whether the upper extremity is in contact with a fixed object other than the seat based on the position of the upper extremity, and in a case where it is determined that the upper extremity is in contact with the fixed object, further correcting the detection value to become larger.

* * * * *